United States Patent
Hanes, Jr.

(10) Patent No.: US 7,013,974 B2
(45) Date of Patent: Mar. 21, 2006

(54) METHODS OF TREATING SUBTERRANEAN ZONES USING GELLED AQUEOUS TREATING FLUIDS CONTAINING ENVIRONMENTALLY BENIGN SEQUESTERING AGENTS

(75) Inventor: Robert E. Hanes, Jr., Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 228 days.

(21) Appl. No.: 10/668,807

(22) Filed: Sep. 23, 2003

(65) Prior Publication Data

US 2005/0061507 A1     Mar. 24, 2005

(51) Int. Cl.
*E21B 43/27* (2006.01)
(52) U.S. Cl. .................... 166/279; 166/300; 166/308.5
(58) Field of Classification Search ............... 166/279, 166/283, 300, 308.2, 308.5; 507/211, 215–217, 507/219, 221, 225, 273
See application file for complete search history.

(56) References Cited

U.S. PATENT DOCUMENTS

| 5,226,481 A | | 7/1993 | Le et al. .................... 166/300 |
| 5,273,580 A | * | 12/1993 | Totten et al. ................ 106/724 |
| 6,024,170 A | * | 2/2000 | McCabe et al. ............ 166/300 |
| 6,488,091 B1 | | 12/2002 | Weaver et al. .............. 166/300 |
| 2003/0144154 A1 | * | 7/2003 | Dobson et al. ............. 507/200 |

* cited by examiner

*Primary Examiner*—Zakiya W. Bates
(74) *Attorney, Agent, or Firm*—Robert A. Kent; Crutsinger & Booth

(57) ABSTRACT

Methods of treating subterranean zones using gelled aqueous treating fluids containing environmentally benign sequestering agents are provided. The methods basically comprise the steps of preparing or providing a treating fluid comprising water containing divalent metal ions, a gelling agent, a borate crosslinking agent and an environmentally benign sequestering agent, and then introducing the treating fluid into the subterranean zone.

30 Claims, 1 Drawing Sheet

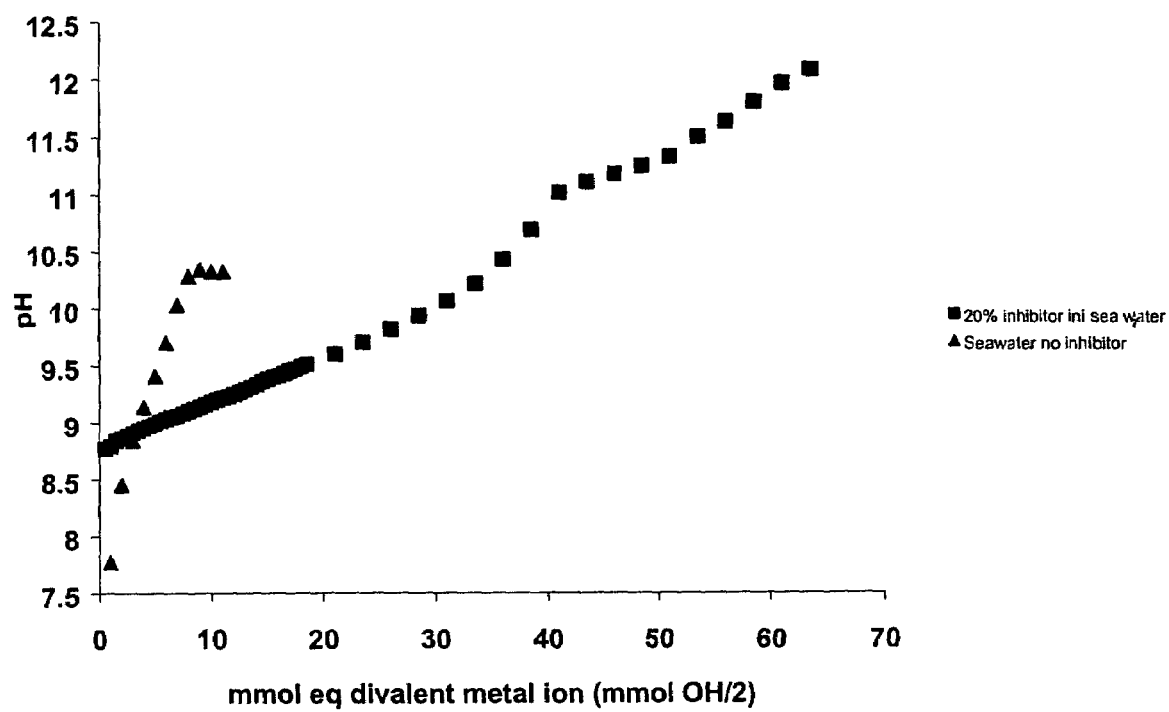

METHODS OF TREATING SUBTERRANEAN ZONES USING GELLED AQUEOUS TREATING FLUIDS CONTAINING ENVIRONMENTALLY BENIGN SEQUESTERING AGENTS

FIELD OF THE INVENTION

The present invention relates to improved methods of treating subterranean zones and gelled aqueous treating fluids containing environmentally benign sequestering agents for sequestering divalent metal ions in seawater, brine or hard water.

BACKGROUND OF THE INVENTION

Gelled aqueous treating fluids are often used to treat subterranean zones penetrated by well bores. For example, gelled aqueous treating fluids are commonly used in hydraulic fracturing operations carried out in subterranean zones to increase the flow of oil and natural gas therefrom.

In hydraulic fracturing operations, a viscous fracturing fluid such as a gelled aqueous fluid is injected into a subterranean zone penetrated by a well bore at a rate and pressure sufficient to create one or more fractures in the zone. Continued pumping of the viscous fracturing fluid extends the fractures and proppant particles such as sand or other particulate material are deposited in the created fractures. The proppant particles function to hold the fractures open after reduction of the pressure applied to the fractures, thus providing conductive channels through which produced fluids can readily flow to the well bore.

To adequately form and propagate fractures in subterranean formations, the fracturing fluid must have sufficient viscosity to create and extend the fractures and to retain proppant particles in suspension. In order to provide viscosity to aqueous fracturing fluids, hydratable gelling agents such as polysaccharide polymers are added to the fluids. The viscosity can be increased further by adding crosslinking agents to the fluids. Examples of conventional crosslinking agents that can be used include borate ions or polyvalent metals such as titanium or zirconium that form chemical bonds between the viscosifying gelling agent molecules and increase the viscosity of the fracturing fluid.

Seawater, brines and hard water contain significant quantities of divalent cations such as $Ca^{+2}$ and $Mg^{+2}$. The use of these water sources for crosslinked gelled treating and fracturing fluids is complicated due to the precipitation of metal hydroxides at the pH range the fluids are most effective. In addition, the effectiveness of borate cross-linked systems for increasing viscosity is reduced when seawater, brines or hard water is used. This is due to the divalent metal ions inhibiting the borate cross-linked gelling agent.

To overcome these problems and allow the use of seawater, brines and hard water, conventional metal ion chelating agents have been utilized. The chelating agents include inorganic polyphosphates, amino polycarboxylic acids, salts of polycarboxylic acids, polyacrylates, and polyphosphonated chelating salts of agents such as diethylenetriamine-penta-(methylene phosphonic acid), salts of nitrolotrimethylenephosphonic acid, salts of ethylenediamine hydroxydiphosphonic acid and salts of ethylenediamine tetramethylene phosphonic acid. These chelating agents have been used to aid borate crosslinking by sequestering the metal ions interfering with the borate crosslinking.

While the chelating agents are generally effective, they are not environmentally benign and environmental regulations often restrict their use.

Thus, there are needs for improved methods of treating subterranean zones and gelled aqueous treating fluids containing environmentally benign sequestering agents for sequestering divalent metal ions in seawater, brine or hard water.

BRIEF DESCRIPTION OF THE DRAWING

The drawing is a graph illustrating the sequestration of divalent cations by an environmentally benign sequestering agent of this invention.

SUMMARY OF THE INVENTION

By the present invention, improved methods of treating subterranean zones and gelled aqueous treating fluid compositions containing environmentally benign divalent metal ion sequestering agents are provided which meet the above-described needs and overcome the deficiencies of the prior art. The improved methods of treating a subterranean zone penetrated by a well bore comprise the following steps. A treating fluid is prepared or provided comprising water containing divalent metal ions, a gelling agent, a borate crosslinking agent and an environmentally benign sequestering agent for sequestering divalent metal ions. Thereafter, the treating fluid is introduced into the subterranean zone.

The present invention also provides improved methods for fracturing a subterranean zone penetrated by a well bore comprising the following steps. A fracturing fluid is prepared or provided comprising water containing divalent metal ions, a gelling agent, a borate crosslinking agent and an environmentally benign sequestering agent for sequestering divalent metal ions. The fracturing fluid is introduced into the subterranean zone by way of the well bore at a rate and pressure sufficient to create one or more fractures.

A treating fluid composition of the present invention comprises water containing divalent metal ions, a gelling agent, a borate crosslinking agent and an environmentally benign sequestering agent for sequestering divalent metal ions. The environmentally benign sequestering agents useful in accordance with this invention are polysuccinimide and polyaspartic acid.

The objects, features and advantages of the present invention will be readily apparent to those skilled in the art upon a reading of the description of preferred embodiments which follows.

DESCRIPTION OF THE PREFERRED EMBODIMENTS

A method of this invention for treating a subterranean zone basically comprises the following steps. A treating fluid is prepared or provided comprising water containing divalent metal ions, a gelling agent, a borate crosslinking agent and an environmentally benign sequestering agent for sequestering divalent metal ions. Thereafter, the treating fluid is introduced into the subterranean formation.

The water containing divalent metal ions utilized in accordance with this invention can be seawater, brine or hard water containing divalent cations such as $Ca^{+2}$ and $Mg^{+2}$.

The hydratable gelling agents that are preferred for use in accordance with the present invention are polysaccharides. Examples of suitable polysaccharide gelling agents that can be used include, but are not limited to, guar, guar derivatives, cellulose derivatives and biopolymers such as guar, hydroxypropylguar, carboxymethylhydroxypropylguar, carboxymethylguar, hydroxyethylcellulose, hydroxyethylcellulose grafted with glycidol or vinyl phosphonic acid, carboxymethylcellulose, carboxymethylhydroxyethylcellulose, xanthan, succinoglycon and the like. Of these, hydroxypropylguar is preferred.

A more preferred viscosity producing polymer for use in accordance with this invention is a substantially fully hydrated depolymerized polymer formed from a polysaccharide of the type set forth above.

Substantially fully hydrated depolymerized polymers can be manufactured by various means. For example, such a polymer can be manufactured by forming a hydratable polymer having a relatively high molecular weight as a result of derivatization of a polysaccharide and then subjecting it to extensive depolymerization whereby the polymer backbone is divided into short chain polymer segments. Specific manufacturing techniques and descriptions of the substantially fully hydrated depolymerized polymers useful in accordance with the present invention are set forth in detail in U.S. Pat. No. 6,488,091 B1 issued on Dec. 3, 2002 to Weaver, et al. which is incorporated in its entirety herein by reference thereto. Of the various substantially fully hydrated depolymerized polymers that are useful in accordance with this invention, a substantially fully hydrated depolymerized hydroxypropylguar polymer is preferred.

The gelling agent used is included in the treating fluid in an amount in the range of from about 0.1% to about 5% by weight of water therein, more preferably from about 0.18% to about 0.95% and most preferably in an amount of about 2%.

Suitable borate crosslinking agents that can be used include, but are not limited to, boric acid, disodium octaborate tetrahydrate, sodium diborate and pentaborates. Of these, boric acid is preferred. The borate crosslinking agent is preferably present in the treating fluid composition in an amount in the range of from about 0.0025% to about 0.1% by weight of water therein, more preferably from about 0.001% to about 0.05% and most preferably about 0.015%.

It has been discovered that sequestering agents such as polyaspartic acid and other related polymers effectively sequester divalent cations such as $Ca^{+2}$ and $Mg^{+2}$, allowing the cations to remain soluble at high pH and without interfering with borate crosslinking of a polysaccharide gelling agent. The sequestering agents are environmentally benign because they are derived from naturally occurring amino acids linked together in polymeric form.

The environmentally benign sequestering agents of this invention are utilized to prevent divalent cations present in salt water, brine or hard water from interfering with the borate cross-linking of polysaccharide gelling agents. Suitable sequestering agents useful in accordance with this invention include polysuccinimide, polyaspartic acid, and polymers, oligomers, chains or block-copolymers of the twenty two essential amino acids containing metal complexing groups such as carboxylic acids, phosphonic acids, sulfonic acids and boronic acids. Preferably, the sequestering agent is polyaspartic acid. The sequestering agent utilized is preferably present in the treating fluid in an amount in the range of from about 1% to about 40% by weight of water therein, more preferably from about 5% to about 20%, and most preferably in an amount of about 12%.

When the sequestering agent is in the form of polysuccinimide, the polysuccinimide acts as a delayed release sequestering agent. That is, given time, formation temperature, and alkaline conditions, the hydrolysis of the polysuccinimide will open the imide rings and produce polyaspartate which then sequesters the divalent metal ions.

Polyaspartate can also be made to hydrolyze and "break" the crosslinked fluid. Hydrolysis of the polyaspartate results in a decrease in viscosity of the crosslinked treating fluid. This is believed to occur by hydrolysis of polyaspartate to produce amino acids which sequester the crosslinking ions.

The present invention also provides an improved method of fracturing a subterranean zone penetrated by a well bore comprising the following steps. A fracturing fluid is prepared or provided comprising water containing divalent metal ions, a gelling agent, a borate crosslinking agent and an environmentally benign sequestering agent for sequestering divalent metal ions. The fracturing fluid is introduced into the subterranean zone by way of the well bore at a rate and pressure sufficient to create one or more fractures therein.

The fracturing fluid carries proppant particles suspended therein into the fractures so that the proppant particles are deposited therein when the fracturing fluid breaks. Suitable proppant particles include, but are not limited to, graded sand, glass beads, sintered bauxite, resin-coated graded sand, ceramic beads and the like.

Delayed chemical breakers known to those skilled in the art can be included in the fracturing fluid to reduce the viscosity of the fracturing fluid.

The treating fluid compositions of this invention comprise water containing divalent metal ions, a gelling agent, a borate crosslinking agent and an environmentally benign sequestering agent. Suitable sequestering agents include, polysuccinimide, polyaspartic acid, and polymers, oligomers, chains or block-copolymers of the twenty two essential amino acids containing metal complexing groups such as carboxylic acids, phosphonic acids, sulfonic acids and boronic acids. As will be understood by those skilled in the art, a variety of conventional additives can be included in the treating fluid compositions such as gel stabilizers, clay stabilizers, bactericides, fluid loss additives and the like which do not adversely react with the biodegradable sequestering agent.

A preferred method of this invention for treating a subterranean zone comprises the steps of:

(a) preparing or providing a treating fluid comprising water containing divalent metal ions, a gelling agent, a borate crosslinking agent, and an environmentally benign sequestering agent for sequestering divalent metal ions; and (b) introducing said treating fluid into said subterranean zone.

A preferred method of forming one or more fractures in a subterranean zone penetrated by a well bore comprises the steps of:

(a) preparing or providing a fracturing fluid comprising water containing divalent metal ions, a gelling agent, a borate crosslinking agent and an environmentally benign sequestering agent for sequestering divalent metal ions; and (b) introducing said fracturing fluid into said subterranean zone by way of said well bore at a rate and pressure sufficient to create one or more fractures therein.

A preferred treating fluid composition for treating a subterranean zone comprises:

water containing divalent metal ions;

a gelling agent;

a borate crosslinking agent; and an environmentally benign sequestering agent.

In order to further illustrate the compositions and methods of the present invention, the following example is given.

EXAMPLE

Polyaspartic acid was added to seawater in an amount of 20% by weight of the seawater. The seawater-polyaspartic acid solution was then potentiometrically titrated with a solution of 1 N sodium hydroxide in water. Thereafter, seawater alone was titrated with the same sodium hydroxide solution. The results of these tests are shown in the accompanying drawing.

As shown in the drawing, the pH of the seawater-polyaspartic solution increases as the sodium hydroxide solution is added. This increase shows that the hydroxide ions are staying in solution and are not precipitating with the divalent cations in the seawater, i.e., the polyaspartic acid is sequestering the divalent cations. This is in contrast to the seawater without a metal ion sequestering agent that increased in pH to a point where precipation occurred. Thereafter, the pH would only increase after all of the precipation had occurred.

Thus, the present invention is well adapted to carry out the objects and attain the benefits and advantages mentioned as well as those that are inherent therein. While numerous changes to the compositions and methods can be made by those skilled in the art, such changes are encompassed within the spirit of this invention as defined by the appended claims.

The invention claimed is:

1. A method of treating a subterranean zone comprising the steps of: (a) preparing or providing a treating fluid comprising water containing divalent metal ions, a gelling agent, a borate crosslinking agent, and an environmentally benign sequestering agent for sequestering divalent metal ions, wherein said environmentally benign sequestering agent is derived from naturally occurring amino acids linked together in polymeric form; and (b) introducing said treating fluid into said subterranean zone.

2. The method of claim 1 wherein said water is selected from the group consisting of seawater, brine and hard water.

3. The method of claim 1 wherein said gelling agent is selected from the group consisting of guar, hydroxypropylguar, carboxymethylhydroxypropylgu- ar, carboxymethylguar, hydroxyethylcellulose, hydroxyethylcellulose grafted with glycidol or vinyl phosphonic acid, carboxymethylcellulose, carboxymethylhydroxyethylcellulose, xanthan, and succinoglycon.

4. The method of claim 1 wherein said gelling agent is hydroxypropylguar.

5. The method of claim 1 wherein said gelling agent is present in said treating fluid in an amount in the range of from about 0.1% to about 5% by weight of said water therein.

6. The method of claim 1 wherein said borate crosslinking agent is selected from the group consisting of boric acid, disodium octaborate tetrahydrate, sodium diborate and pentaborates.

7. The method of claim 1 wherein said borate crosslinking agent is boric acid.

8. The method of claim 1 wherein said borate crosslinking agent is present in said treating fluid in an amount in the range of from about 0.0025% to about 0.1% by weight of said water therein.

9. The method of claim 1 wherein said environmentally benign sequestering agent is selected from the group consisting of polysuccinimide, polyaspartic acid, and polymers, oligomers, chains or block-copolymers of the twenty two essential amino acids containing metal complexing groups selected from the group consisting of carboxylic acids, phosphonic acids, sulfonic acids and boronic acids.

10. The method of claim 1 wherein said environmentally benign sequestering agent is polyaspartic acid.

11. The method of claim 1 wherein said environmentally benign sequestering agent is polysuccinimide, and said treating fluid comprises the necessary alkalinity to cause hydrolysis of said polysuccinimide to form polyaspartate within a desired time.

12. The method of claim 1 wherein said environmentally benign sequestering agent is present in said treating fluid in an amount in the range of from about 1% to about 40% by weight of said water therein.

13. A method of forming one or more fractures in a subterranean zone penetrated by a well bore comprising the steps of: (a) preparing or providing a fracturing fluid comprising water containing divalent metal ions, a gelling agent, a borate crosslinking agent and an environmentally benign sequestering agent for sequestering divalent metal ions, wherein said environmentally benign sequestering agent is derived from naturally occurring amino acids linked together in polymeric form; and (b) introducing said fracturing fluid into said subterranean zone by way of said well bore at a rate and pressure sufficient to create one or more fractures therein.

14. The method of claim 13 wherein said water is selected from the group consisting of seawater, brine and hard water.

15. The method of claim 13 wherein said gelling agent is selected from the group consisting of guar, hydroxypropylguar, carboxymethylhydroxypropylgu- ar, carboxymethylguar, hydroxyethylcellulose, hydroxyethylcellulose grafted with glycidol or vinyl phosphonic acid, carboxymethylcellulose, carboxymethylhydroxyethylcellulose, xanthan, and succinoglycon.

16. The method of claim 13 wherein said gelling agent is hydroxypropylguar.

17. The method of claim 13 wherein said gelling agent is present in said fracturing fluid in an amount in the range of from about 0.1% to about 5% by weight of said water therein.

18. The method of claim 13 wherein said borate crosslinking agent is selected from the group consisting of boric acid, disodium octaborate tetrahydrate, sodium diborate and pentaborates.

19. The method of claim 13 wherein said borate crosslinking agent is boric acid.

20. The method of claim 13 wherein said borate crosslinking agent is present in said fracturing fluid in an amount in the range of from about 0.0025% to about 0.1% by weight of said water therein.

21. The method of claim 13 wherein said environmentally benign sequestering agent is selected from the group consisting of polysuccinimide, polyaspartic acid, and polymers, oligomers, chains or block-copolymers of the twenty two essential amino acids containing metal complexing groups selected from the group consisting of carboxylic acids, phosphonic acids, sulfonic acids and boronic acids.

22. The method of claim 13 wherein said environmentally benign sequestering agent is polyaspartic acid.

23. The method of claim 13 wherein said environmentally benign sequestering agent is polysuccinimide, and said fracturing fluid comprises the necessary alkalinity to cause hydrolysis of said polysuccinimide to form polyaspartate within a desired time.

24. The method of claim 13 wherein said environmentally benign sequestering agent is present in said fracturing fluid in an amount in the range of from about 1% to about 40% by weight of said water therein.

25. The method of claim 13 wherein said fracturing fluid further comprises proppant particles.

26. A method of treating a subterranean zone comprising the steps of: (a) preparing or providing a treating fluid comprising water containing divalent metal ions, a gelling agent, a borate crosslinking agent, and an environmentally benign sequestering agent for sequestering divalent metal ions; and (b) introducing said treating fluid into said subterranean zone, wherein said environmentally benign sequestering agent is selected from the group consisting of polysuccinimide, polyaspartic acid, and polymers, oligomers, chains or block-copolymers of the twenty two essential amino acids containing metal complexing groups selected from the group consisting of carboxylic acids, phosphonic acids, sulfonic acids and boronic acids.

27. A method of treating a subterranean zone comprising the steps of: (a) preparing or providing a treating fluid comprising water containing divalent metal ions, a gelling agent, a borate crosslinking agent, and polyaspartic acid; and (b) introducing said treating fluid into said subterranean zone.

28. A method of treating a subterranean zone comprising the steps of: (a) preparing or providing a treating fluid comprising water containing divalent metal ions, a gelling agent, a borate crosslinking agent, and polysuccinimide; and (b) introducing said treating fluid into said subterranean zone.

29. A method of forming one or more fractures in a subterranean zone penetrated by a well bore comprising the steps of: (a) preparing or providing a fracturing fluid comprising water containing divalent metal ions, a gelling agent, a borate crosslinking agent and polyaspartic acid; and (b) introducing said fracturing fluid into said subterranean zone by way of said well bore at a rate and pressure sufficient to create one or more fractures therein.

30. A method of forming one or more fractures in a subterranean zone penetrated by a well bore comprising the steps of: (a) preparing or providing a fracturing fluid comprising water containing divalent metal ions, a gelling agent, a borate crosslinking agent and polysuccinimide; and (b) introducing said fracturing fluid into said subterranean zone by way of said well bore at a rate and pressure sufficient to create one or more fractures therein.

* * * * *